J. B. HARRISS.
WRAPPER APPLYING MECHANISM.
APPLICATION FILED AUG. 17, 1917.

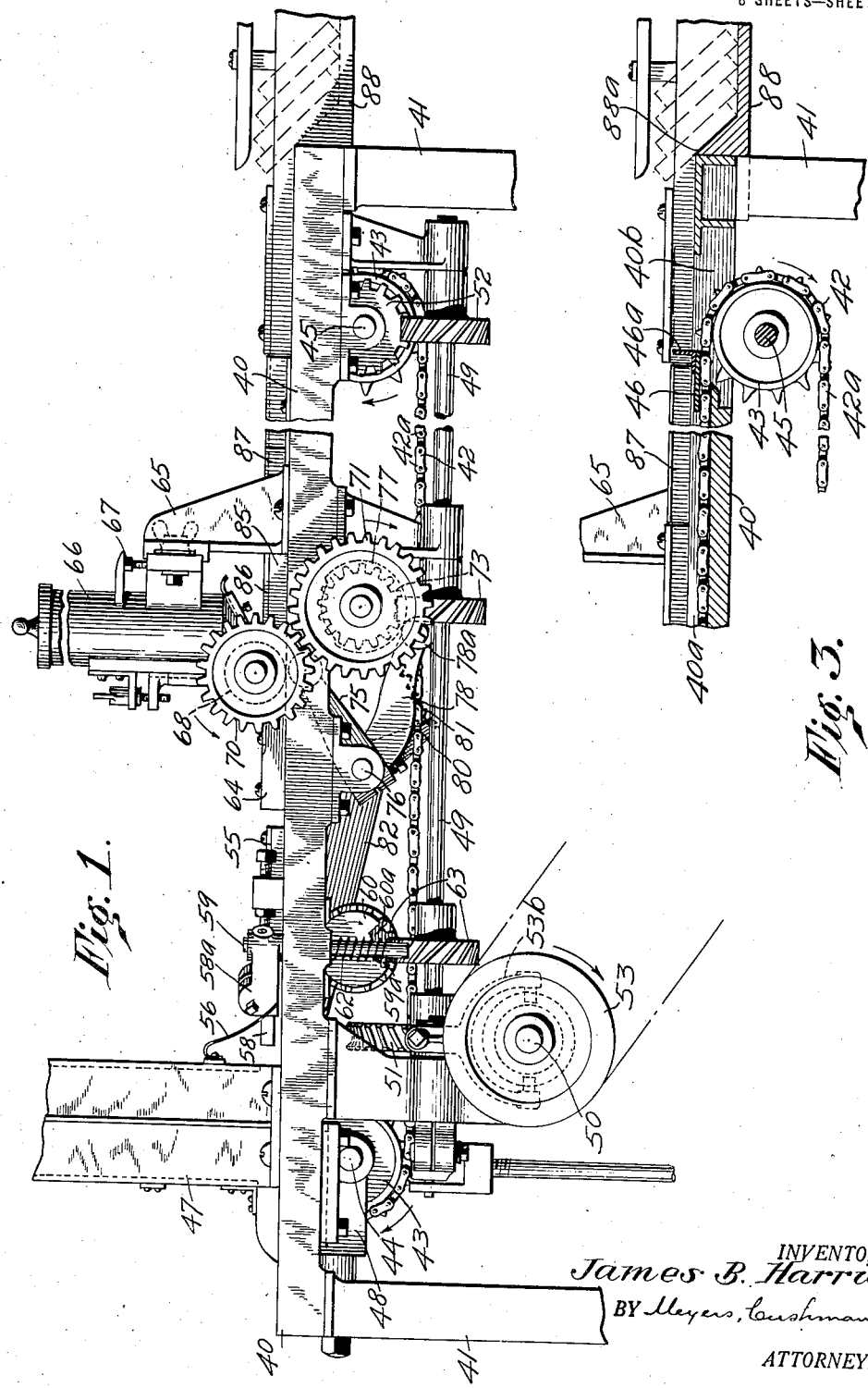

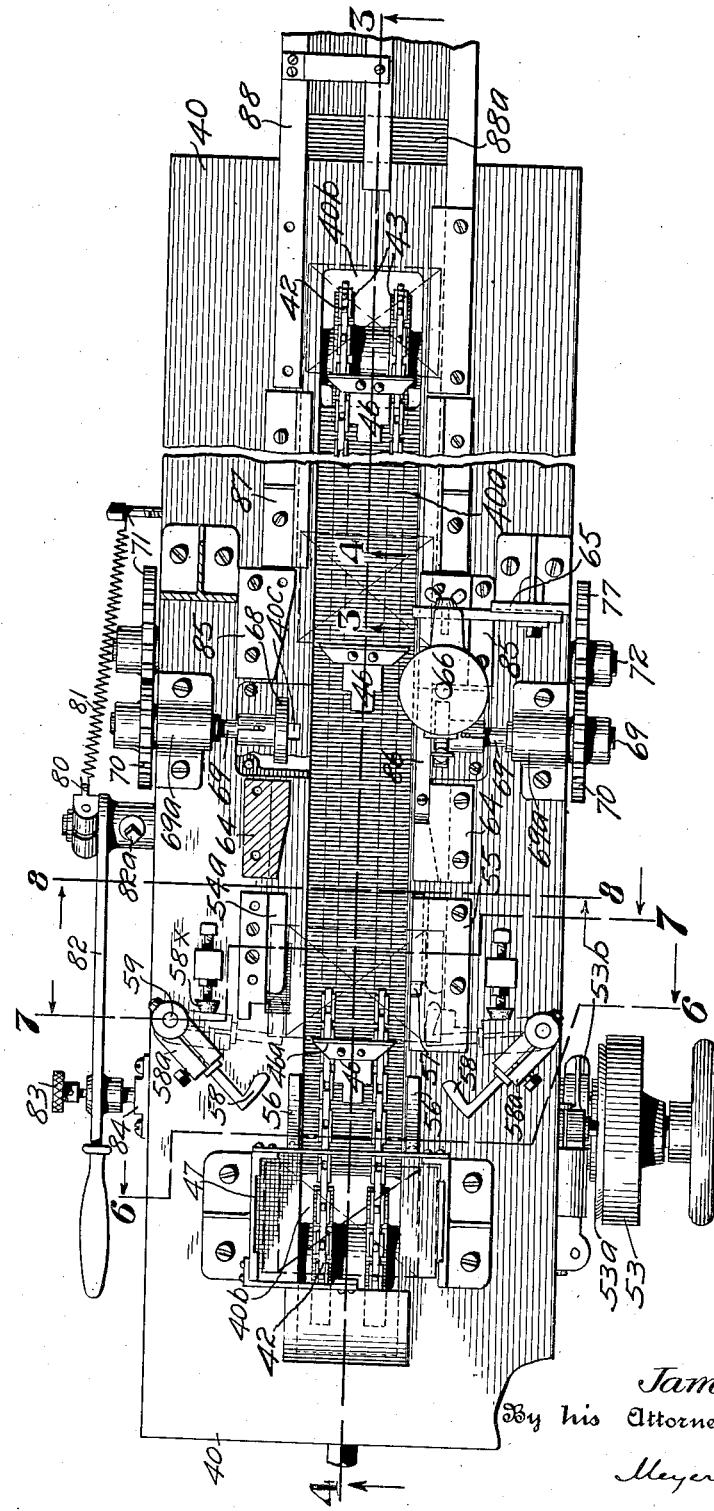

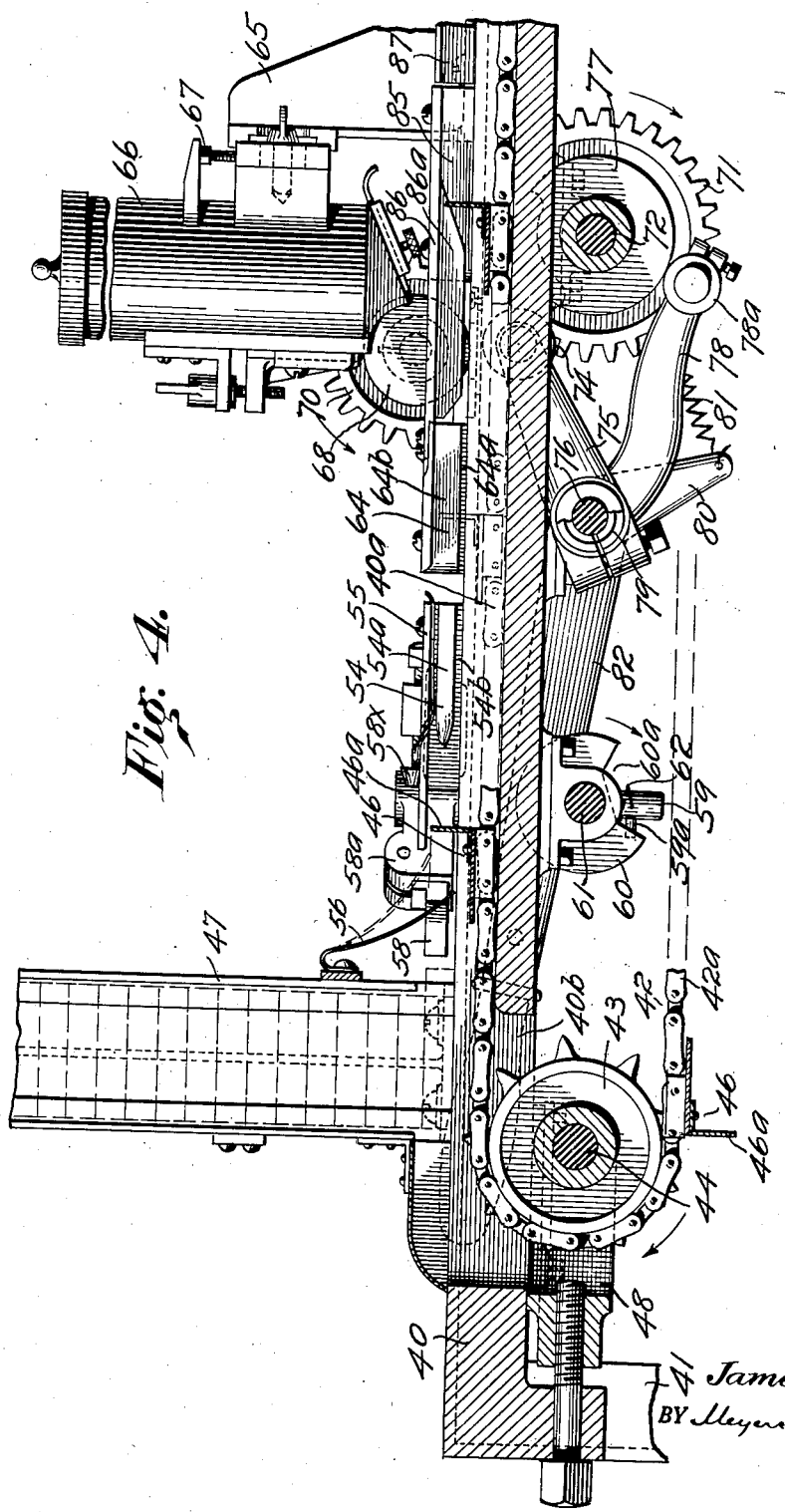

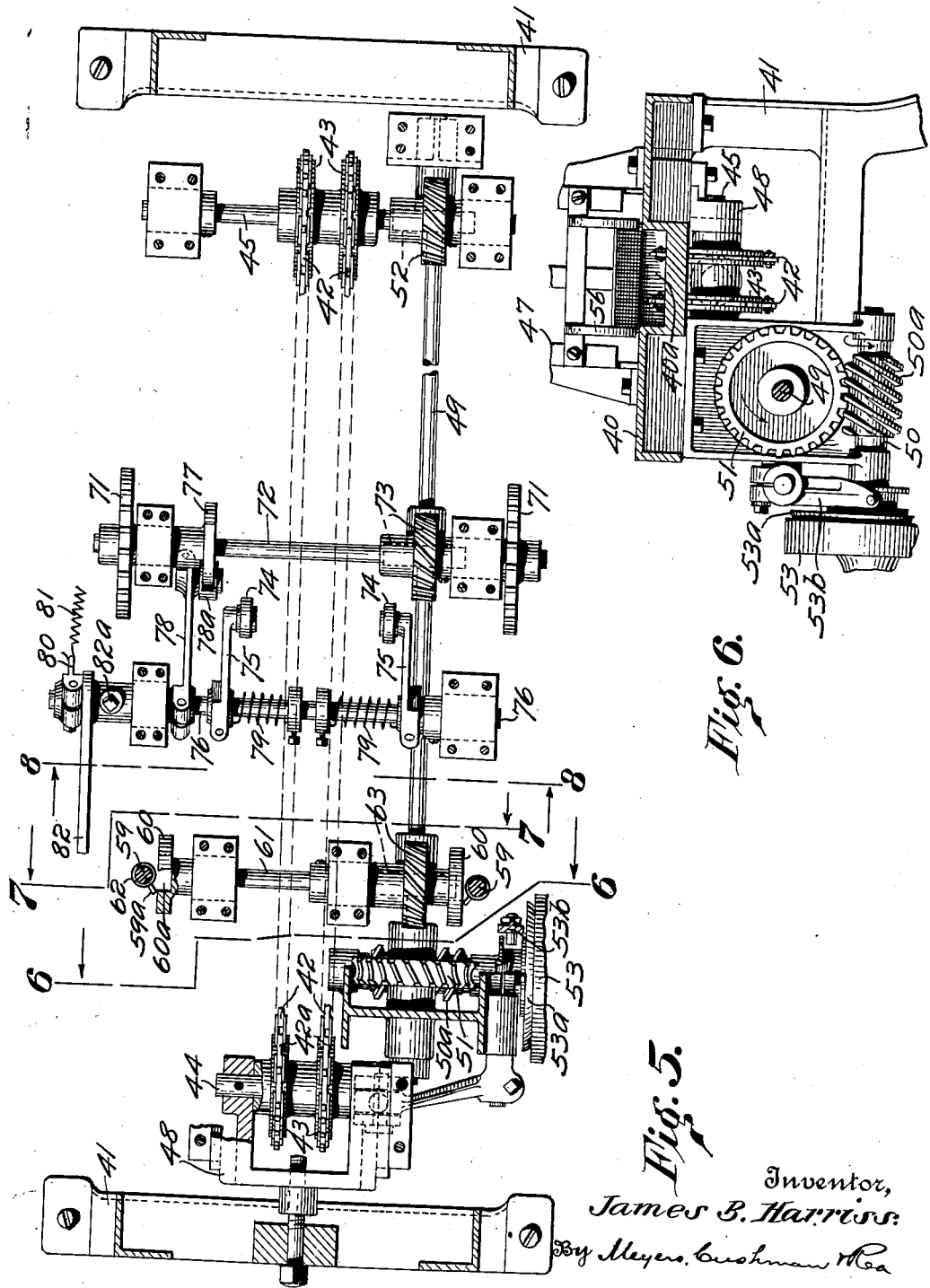

1,350,608.

Patented Aug. 24, 1920.
8 SHEETS—SHEET 5.

Inventor,
James B. Harriss.
By his Attorneys,
Meyers, Cushman &Rea

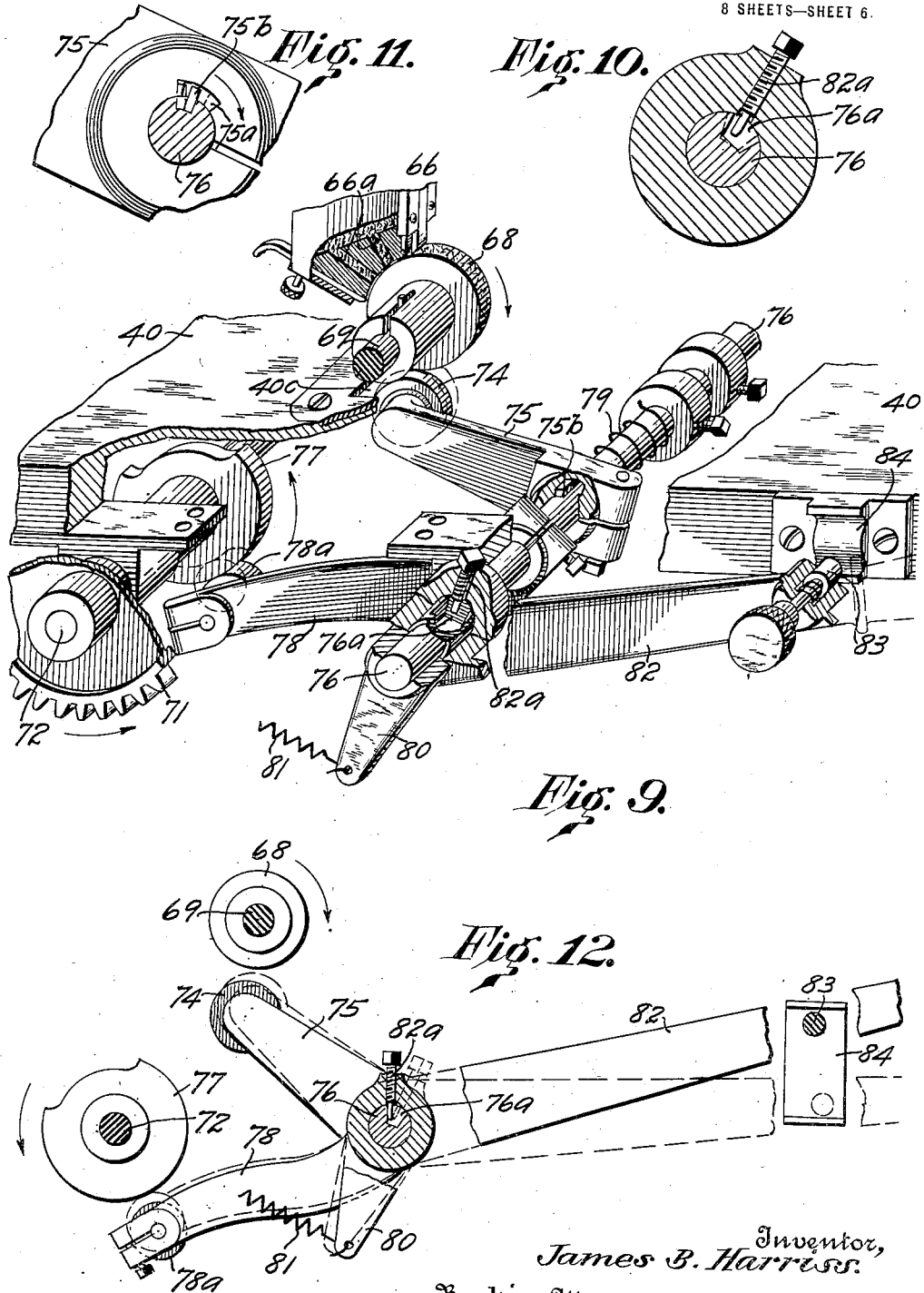

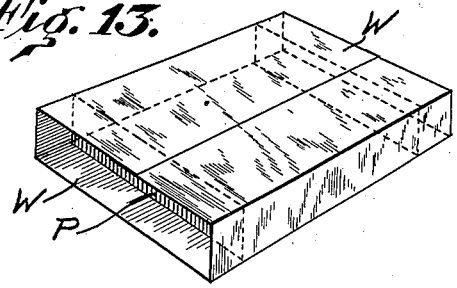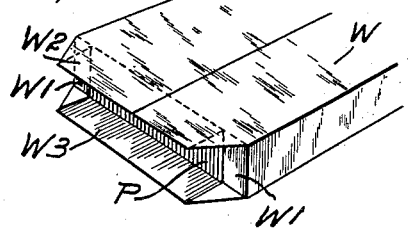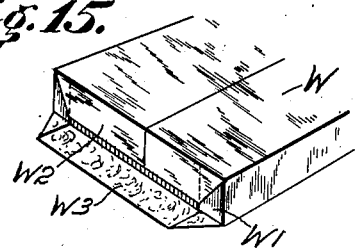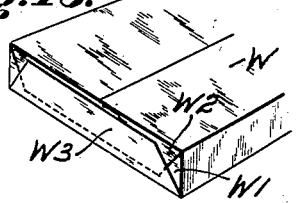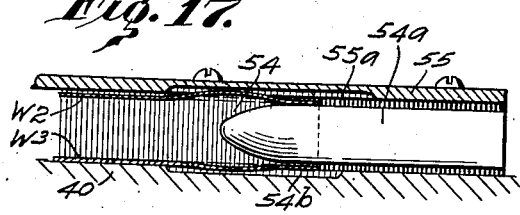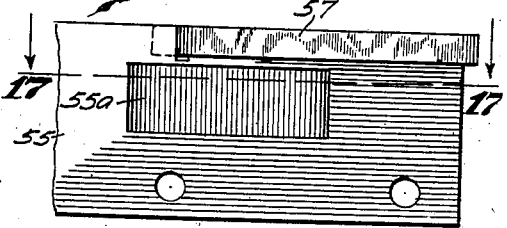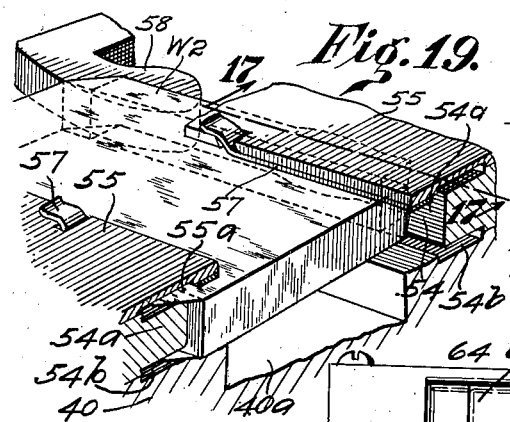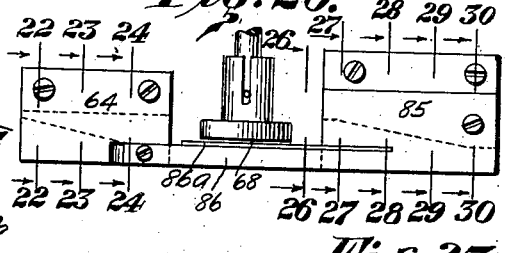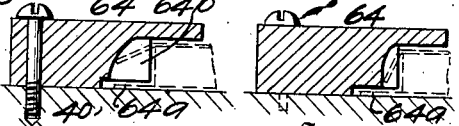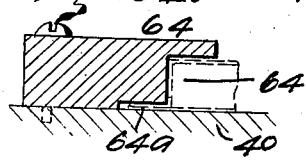

J. B. HARRISS.
WRAPPER APPLYING MECHANISM.
APPLICATION FILED AUG. 17, 1917.

1,350,608.

Patented Aug. 24, 1920.
8 SHEETS—SHEET 8.

Inventor,
James B. Harriss.
By his Attorneys,
Meyers, Cushman & Rea

UNITED STATES PATENT OFFICE.

JAMES B. HARRISS, OF NEWARK, NEW JERSEY, ASSIGNOR TO P. LORILLARD COMPANY, OF NEW YORK, N. Y., A CORPORATION OF NEW JERSEY.

WRAPPER-APPLYING MECHANISM.

1,350,608.

Specification of Letters Patent.     Patented Aug. 24, 1920.

Application filed August 17, 1917. Serial No. 186,670.

*To all whom it may concern:*

Be it known that I, JAMES B. HARRISS, a citizen of the United States, residing at Newark, in the county of Essex and State of New Jersey, have invented new and useful Improvements in Wrapper-Applying Mechanisms, of which the following is a specification.

This invention relates to improvements in wrapper applying mechanisms, pertaining more particularly to the application of a "loose" wrapper about a packet to produce a wrapped package.

The present invention is designed more particularly for the wrapping of packages of regular contour, preferably having faces extending angularly to each other, such for instance as closed boxes or cartons, plug tobacco, etc., the mechanism being of a type to permit of relatively high capacity, the wrapping operation being completed during travel of the packet continuously in an approximately horizontal plane, adhesive being applied during the advancing movement, thereby completing the wrapped package during such movements.

Other objects are the provision of mechanism which is simple and efficient in operation, durable in construction, and which will operate in connection with various forms of wrapping material.

To these and other ends, the nature of which will be readily understood as the invention is hereinafter disclosed, said invention consists in the improved construction and combination of parts hereinafter more fully described, illustrated in the accompanying drawings, and more particularly pointed out in the appended claims.

In the accompanying drawings, in which similar reference characters indicate similar parts in each of the views:—

Figure 1 is a side elevation of a preferred embodiment of the invention.

Fig. 2 is a plan view of the same.

Fig. 3 is a vertical sectional view taken on line 3—3 of Fig. 2.

Fig. 4 is a vertical sectional view taken on line 4—4 of Fig. 2, the parts being generally on an enlarged scale.

Fig. 5 is a view, partly in top plan and partly in horizontal section, of portions of the operating mechanism, the top plate of the frame and the parts positioned thereon being omitted.

Figure 7:
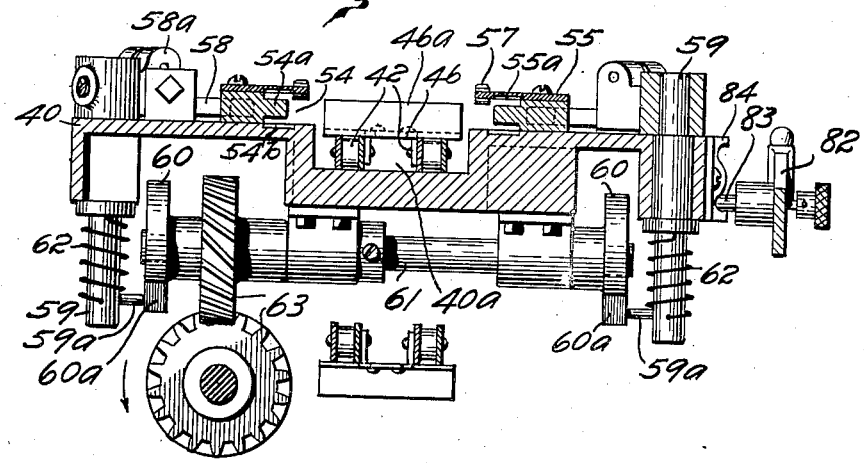
Figure 8:
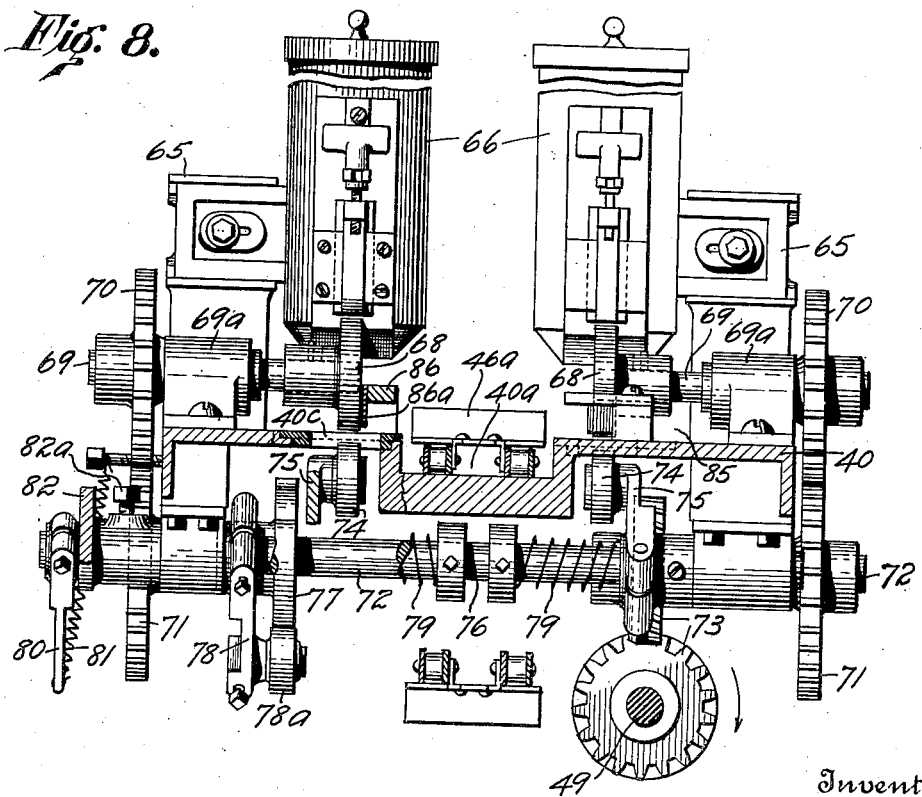

Figs. 6, 7 and 8 are sectional views taken respectively on line 6—6, 7—7, and 8—8 of Fig. 5.

Fig. 9 is a perspective view showing mechanism for controlling the application of the adhesive.

Figs. 10 and 11 are detail sectional views of parts of the mechanism of Fig. 9.

Fig. 12 is a view, somewhat diagrammatic, indicating the movements of portions of the adhesive-applying instrumentality.

Fig. 13 is a perspective view of a packet and wrapper blank relatively positioned for introduction into the mechanism of the present invention.

Figs. 14 to 16 indicate stages in the wrapping operation.

Fig. 17 is a sectional view taken on line 17—17 of Figs. 18 and 19.

Fig. 18 is a bottom plan view of a top plate forming part of the folding channel.

Fig. 19 is a sectional perspective view showing a portion of the folding channel.

Fig. 20 is a top plan view of the folding channel portion of the mechanism.

Fig. 21 is an end view of the same.

Figs. 22 to 24 and Figs. 26 to 30 inclusive are sectional detail views taken respectively on lines 22—22, 23—23, 24—24, 26—26, 27—27, 28—28, 29—29, and 30—30 of Fig. 20.

Figure 25:
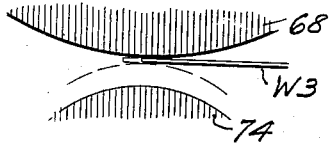
Figures 26, 27:
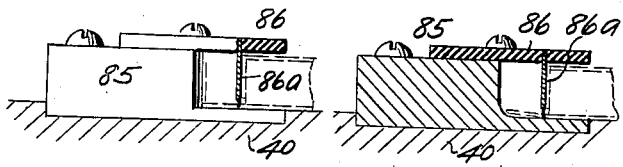

Fig. 25 is a detail view indicating movements of the adhesive-applying mechanism.

Figure 31:
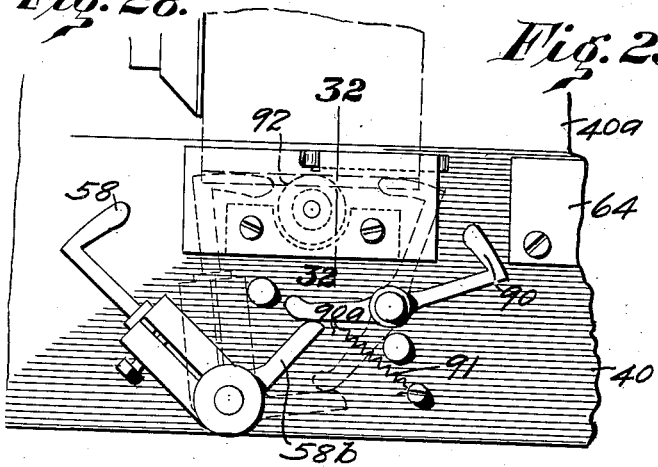

Fig. 31 is a top plan view of a modified form of turning-in mechanism.

Figure 32:
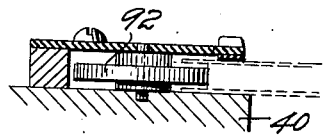

Fig. 32 is a sectional view taken on line 32—32 of Fig. 31.

Figure 33:
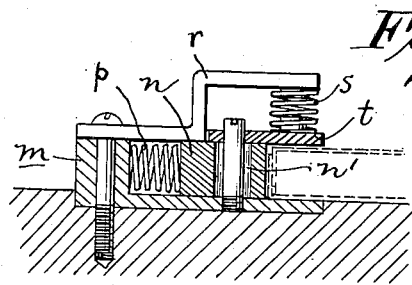

Fig. 33 is a cross-sectional view showing the use of yielding folders.

It is the practice, more particularly in connection with tobacco products, to apply a wrapper, either to the container for the product, as for instance, boxes containing cigarettes, or the packet itself, as for instance plug tobacco, these wrappers being generally of a material or materials which will aid in maintaining the normal characteristics of the tobacco product while in package form. For instance, in connection with plug tobacco, the wrapper may be in the nature of paraffin paper; in connection with the wrapper of cigarette boxes, it is a common practice to employ a comparatively thin wrapper known as a "glazed" wrapper. Both types of wrappers are, by reason of the peculiar texture, more or less difficult to properly wrap by automatic means, especially where the apparatus employed is to provide for comparatively high capacity. The wrapping, in order to produce an attractive wrapped package, should provide a more or less symmetrical appearance to the container, and the various folds should be made without tending to damage the wrapper or its appearance. The present invention is designed to meet the conditions arising from the use of wrappers of materials of this type, although, of course, it is not intended to be limited in scope to such use, as it is obvious that, being able to provide neat wrapping with wrappers of these materials, the mechanism will operate in connection with wrappers formed of material of a less difficult type to manipulate. Nor is the invention intended to be limited to use in the wrapping of packages containing tobacco products, since it is also obvious that the mechanism will operate with commodities of other types.

Before describing the detail structure and operation of the present invention, a brief description of the wrapping operation and its effect in the production of the package will be given.

The apparatus herein disclosed is designed more particularly to operate on a partially wrapped packet, Fig. 13 indicating the form in which the packet and wrapper—which may be considered as a charge—is delivered into the mechanism. In this view, the packet, shown as a box of cigarettes, is indicated at P, the "glazed" wrapper being indicated at W, the latter being simply folded around the wide and narrow sides of the box with the ends of the wrapper in overlapping relation and preferably adhesively connected, the wrapper at the ends of the packet being unfolded, the walls at the ends projecting outwardly in the several planes of the applied portions of the wrapper. This charge may be produced in any preferred way, as by the use of a suitable wrapping mechanism or by hand, as may be found desirable. If formed by machine, the present invention may be made a part of such machine or an attachment thereto, the successively-produced charges being delivered to the magazine of the present invention. Obviously, this positioning of the charges may be provided in other ways, as by an operator simply depositing a number of charges in the magazine from which they are successively taken automatically and advanced through the mechanisms of the present invention by a continuous movement in a substantially horizontal plane, the ends being properly folded and adhesively connected, the completed package being delivered at the end of the machine.

Figs. 14, 15 and 16 indicate different stages in the end-folding operations during the advance travel. For instance, the first action is to change the general end configuration from the peripheral form to a form having flaps; in other words, the first step is to produce opposing flaps at the ends, this being had by turning-in the ends of the narrow walls of the packet, forming an end-lap formation, as shown in Fig. 14, this being provided by a suitable mechanism located in the path of travel of the charge. This produces a flap having its ends of double thickness (Fig. 14). The next operation is to turn down the upper flap, as shown in Fig. 15 leaving the lower flap in its initial plane with its upper surface exposed. This surface is then brought into the zone of the adhesive-applying mechanism which applies a suitable amount of adhesive to such exposed face, after which this lower flap, with its adhesive coating, is folded up into overlapping relation and into contact with the down-turned flange and the end laps, thus adhesively connecting the two flaps in such manner as to provide a symmetrical appearance to the end of the package.

40 indicates a table-like top frame to which the major portion of the operating mechanisms is secured; this frame portion—indicated as a table—being supported in suitable manner as by legs 41, and being elongated in the direction of travel of the charge, and, as shown in Fig. 2, being narrow in width relative to such length. The table is provided with a depressed portion extending in the direction of length thereof and adapted to provide a longitudinal recess 40ª; the bottom of the recess being omitted at the opposite ends of the depressed portion, to form openings 40ᵇ adjacent opposite ends of the frame. 42 indicates a traveling carrier or conveyer; shown as in the form of a pair of endless chains 42ª, spaced apart and adapted to travel on suitable wheels, such for instance as sprocket wheels 43 mounted on shafts 44 and 45, said shafts being mounted at the opposite ends of recess 40ª, wheels 43 extending into openings 40ᵇ, this structure being such as to cause the upper flight of the chains of the carrier to travel within the longitudinal recess 40ª, the lower flight of these chains traveling beneath the table.

Predetermined links of chains 42ª are connected by plate structures 46 which include a vertical portion 46ª forming a member projecting above the table and which serves to advance a charge through the folding instrumentalities, this movement of members 46ª being provided by the traveling carrier.

It is preferred to employ a plurality of members 46ª spaced apart in the direction of length of the carrier, so that as the latter advances in the direction indicated by the arrow in Fig. 4, members 46ª successively pass through the lower open end of a magazine 47 which carries the charges in superposed relation, the charges, as heretofore pointed out, being of the type indicated in Fig. 13, the magazine being so formed as to permit of the discharge through its rear face of the lowermost charge contained within the magazine. As shown in Fig. 2, the width of recess 40ª is less than the length of the charge, so that the under face of the lower charge, when in the magazine, rests upon the top face of table 40. When, therefore, a member 46ª passes into contact with the rear face of the lower charge, the advancing movement of member 46ª carries the charge out of the magazine and advances it along the table top which is substantially on a single plane throughout its length.

Shaft 44 is preferably mounted in an adjustable bearing 48 by means of which the chains can be held at the desired tension.

The movements of the carrier are provided from a shaft 49 extending longitudinally of the machine below the table, shaft 49 being driven from a suitable drive shaft 50, the latter having a worm 50ª which engages a worm gear 51 on shaft 49 (Fig. 6). The operating connection between shaft 49 and the carrier is provided by connecting shaft 45 of the carrier with main shaft 49 by means of a spiral gear connection indicated at 52 (Figs. 1 and 5). Since shaft 50 is of constant drive, shaft 49 will be driven continuously but at reduced speed, shaft 45, traveling at the same speed as shaft 49, being also constantly driven. As a result, the movements of the carrier will be continuous while shaft 50 is in operation.

Shaft 50 is driven from a suitable source of power (not shown), a suitable controlling friction clutch device connecting the power with the shaft. In the drawings, 53 indicates a pulley driven from the source of power, this pulley forming part of a friction clutch, the complemental member being indicated at 53ª, this member being moved toward and from pulley 53 by a suitable fork device 53ᵇ the movements of which are under the control of the operator by suitable treadle mechanism, not shown, the operating connections acting to provide movements to fork 53ᵇ so as to engage or disengage the clutch device.

It will be obvious that the form of clutching mechanism disclosed is more or less illustrative, any suitable mechanism capable of being controlled by the operator being usable for the purpose, it being understood that in the operation of this machine the movements of the carrier are continuous and hence this particular coupling device is intended to be operated only when the operator wishes to start or stop the machine operation as an entirety.

As shown in Figs. 7 and 8, members 46ª are of considerable length and therefore provide a length of contact with the rear face of the charge extending over a considerable portion of said rear face, the result being that although the charge is not gripped while being conveyed, its position relative to members 46ª will not be materially varied throughout the travel, these members 46ª having their directions of length extending at direct right angles to the direction of travel of the carrier and advance the charge without lateral shifting. Hence, the packet is not subjected to any gripping pressures during the advance of the charge, and at the same time, that portion of the wrapper which extends around the side walls of the packet is not subjected to damaging action such as is liable where the charge is actually gripped. As will be understood, the lateral position of the charge on the conveyer is determined by the magazine, such position being unchanged after the charge has passed out of the positioning influence of the magazine.

The initial folding action provided on the traveling charge is to turn-in the portions of the wrapper which are located at the ends of the narrower side walls of the charge, as in Fig. 14, thus changing the configuration and producing opposing flaps. These turned-in portions may be considered as end laps and are indicated at $w'$. In the drawings I have shown two ways in which this turning-in of the end laps may be provided, Fig. 31 showing one way of producing this result, the other and preferred way being disclosed in certain of the remaining figures.

A preferred manner of producing this turning-in of the end laps is by the use of folding channels 54 having inwardly projecting ribs 54ª spaced from the top and bottom walls of the channel, the advance end of each rib being more or less curved in order to provide a nose operative to produce a gradual inturning of the end lap at the advancing end of the charge, the specific arrangement being shown more particularly in Figs. 17 to 19 inclusive.

As will be readily understood, the advancing charge, in the form shown in Fig. 13, brings the advance end laps into contact with the nose of rib 54ª, the continued advance of the charge causing these laps to be moved inward against the end walls of the packet, this action being completed by the main portion of ribs 54ª which act to hold the folded lap in this position while traveling through the channel. The upper end flap $w^2$ and lower end flaps $w^3$ of the wrapper thus produced are adapted to pass through the small channels located above and below rib 54ª.

Owing to the particular character of the wrapper, there may be a tendency of the unsupported ends of the latter to buckle at the time when the end laps are being turned-in, this possibility being indicated by the full line position of the wrapper in Fig. 17. This buckling action is not detrimental unless an actual crease or fold is produced in such end flaps, a result which is possible in attempting to carry the end flap portions directly into the small channels. To prevent such creasing or folding action, I preferably provide recesses 54ᵇ in the table top, and recesses 55ª in plates 55 which form the upper walls of the folding channel, these recesses permitting the material of the end flaps to buckle outwardly, as shown in Fig. 17 so as to insure proper action of the nose of ribs 54ª, it being readily understood that after the end laps have been properly seated, the buckled flaps will resume the normal position, the tendency to buckle being present at the time when contact is first had with the walls of the wrapper ends and during the earlier stages of the turning-in of the laps.

If desired, I may employ a spring finger 56, carried by the magazine for the purpose of holding the charge properly seated on the table top while the charge is approaching the folding channel, thus insuring proper registration of the charge with the folding channel. For a similar purpose, I also preferably provide plates 55 with yieldable members or fingers 57 (Figs. 18 and 19), these fingers tending to retain the charge in proper position on the table top while passing this stage.

While this particular mechanism just described is adapted to turn-in the advance end laps, it will be obvious that ribs 54ª would be ineffective to turn-in the rear end laps while the charge is moving forward. As it is desired that the charge have a continuous advancing movement, separate means are provided for turning-in these rear end laps, such means being rendered active while a portion of the wrapper ends is within folding channel 54 but prior to the time the rear of the charge reaches the nose of ribs 54ª, since it is essential that the rear end laps be turned-in before reaching any portion of ribs 54ª. This means is made active on the end laps by a pair of fingers movable on vertical axes, these fingers normally lying outside of the path of travel of the charge, and being oscillated to carry the working face of each finger into contact with the rear end walls of the charge, this action being provided after the charge has advanced beyond the normal position of the fingers, the latter then advancing at a rapid speed so as to cause the fingers to cross said rear walls and turn them in to produce the rear end laps while the charge is advancing. In Fig. 2, the fingers, in normal or inactive position, are shown in full lines, the dotted line representation indicating the position of the fingers at the completion of turning-in movement.

The fingers, indicated at 58, are shown as adjustably carried in members 58ª secured on vertical shafts 59, it being understood that an independent finger is located on each side of the travel path of the charge. As will be obvious, such adjustment varies the radius of the arc through which the finger or working face travels. Shaft or rod 59 extends downwardly beneath table 40 and, at a suitable point, carries a radially extending pin 59ª (Figs. 1, 5 and 7), normally held in contact with the face of a cam 60 mounted on a shaft 61, cam 60 having a cut-away portion 60ª into which pin 59ª passes when the recess or cut-away portion 60ª comes opposite to such pin during rotation of shaft 61. Pin 59ª is held in contact with the cam by a spring 62 mounted on shaft or rod 59, said spring being adapted to move shaft or rod 59 and its finger 58 from the position shown in full lines to that shown in dotted lines in Fig. 2, this movement taking place when the restraint of cam 60 on pin 59ª is removed. Obviously, spring 62 will be of sufficient power for the purpose of providing this movement with sufficient rapidity, or, if desired, an additional power device in the form of a spring may be connected up so as to insure for proper movement at high speed. As will be understood, continued rotation of the cam, after pin 59ª has been released, will cause pin 59ª to be returned to its normal position, thus returning the fingers to such position.

Shaft 61 is driven from main shaft 49 by suitable gear connections, as for instance the spiral gear combination indicated at 63. This arrangement permits of absolute timing control of the movements of the fingers, it being readily understood that the period of time during which finger activity is possible is more or less limited. By adjusting the angular position of cams 60 on shaft 61, it is obvious that the time of action can be accurately gaged so far as the advancing movements of the fingers are concerned. Obviously, the time of return movement of the fingers is limited only by the necessity for having these fingers out of the path of travel of the succeeding charge.

Any suitable means may be employed for limiting the advancing movements of fingers 58. In Fig. 2 I have shown this as in the form of a yielding bumper or stop 58ˣ adjustably mounted in the path of travel of member 58ª.

The completion of the advance movement of fingers 58 places the wrapper of the charge in the condition shown in Fig. 14 with the end laps turned-in, and producing the unfolded upper and lower end flaps. As the charge continues its advance, it is brought into the sphere of action of a pair of members which are adapted to fold or turn down the upper end flap $w^2$, these members being stationary, the advancing movement of the charge causing the flap to be turned down by the action of folding faces carried by these members.

The upper end flap folding members 64 are shown more particularly in Figs. 2, 4 and 20 to 24, being in the form of blocks which are undercut to produce a channel or channels into and through which the unfolded end flaps pass. As shown more particularly in Figs. 21 to 24, the under cutting provides a narrow channel $64^a$ adjacent the table top, this channel being of uniform depth throughout the length of the member and is adapted to permit of the free passage of the lower end flap $w^3$. The portion of the undercut of member or block 64 above channel $64^a$ and indicated at $64^b$, varies as to configuration, as shown in Figs. 21 to 24, this variation permitting the advance end of the upper end flap to enter the member before turning-in action takes place (Fig. 21), after which such upper flap is progressively turned downward (Figs. 22 and 23) until it practically contacts with the end wall of the packet (Fig. 24), thus providing the general configuration shown in Fig. 15, and placing the charge in folded condition ready to receive the coating of adhesive which is to be applied to the upper face of the lower end flap by mechanism now to be described.

Detachably mounted on standards 65 positioned on opposite sides of the travel path of the charge (Fig. 2) are adhesive containers 66, said containers each being adapted to carry a supply of adhesive which may be discharged through channels $66^a$ formed at the bottoms of the containers (Fig. 9). Suitable means are provided for detachably connecting each container with its standard, such means permitting adjustment of each container laterally (Fig. 8), said parts also having an adjustable stop structure 67 adapted to limit the downward movement of the container. Each container has suitable mechanisms for controlling the flow of adhesive from the container so as to provide for the proper application and distribution of the adhesive on to the face of a roll 68 positioned above the top of table 40, said table having an opening $40^c$ below each roll 68. An independent roll 68 is provided on each side of the charge travel path, said rolls being mounted on shafts 69 extending through bearings $69^a$, the rolls being preferably adjustable in the direction of length of the shaft, as shown more particularly in Fig. 9.

As shown in Fig. 2, rolls 68 are positioned at a point in direct succession to blocks 64, so that the advancing charge, in the form shown in Fig. 15, passes the upper face of flap $w^3$ beneath a roll 68. Rolls 68 are positively driven, each shaft 69 carrying a gear 70 meshing with a gear 71 mounted on shaft 72, said latter shaft having a direct connection with main shaft 49 through the spiral gear structure indicated at 73 (Fig. 5). As a result, the working faces of rolls 68 are constantly receiving a thin film of adhesive, the flaps $w^3$ being passed into contact with this film as the charge advances, the direct drive connection between the main shaft and the rolls insuring a proper timing action with respect to the speeds of travel of the charge and the rolls, so that the coating, as applied to the flaps $w^3$, is uniformly distributed thereon, thereby practically insuring a neat appearance of the secured flap in the finished package.

To more effectively produce this uniformity in adhesive distribution, I preferably cause the flaps to be held in contact with the adhesive-carrying face of the rolls by pressure applied on the under side of the flap. Since successive charges are spaced on the carrier, so that flaps are presented to rolls 68 intermittently instead of continuously, the pressure-applying means must operate in an intermittent manner in order that the pressure-applying roll is not brought into direct contact with the adhesive coating of roll 68. This result is obtained by mechanism which is more particularly shown in detail in Fig. 9, in which 74 indicates a pressure-applying roller rotatably mounted at the end of an arm 75 carried by a shaft 76.

Roller 74 is made active intermittently by oscillating movements of shaft 76, these oscillations being controlled by a cam 77 carried by shaft 72, shaft 76 having an arm 78 carrying a roller $78^a$ which is normally adapted to ride in contact with the periphery of cam 77.

In mechanism for applying adhesive in apparatus of this type, two general conditions are present where it is desired to provide a neat appearance to the package. One of these conditions is the uniform distribution of the adhesive on the flap—excessive pressure of the flap on the film will tend to affect such distribution. Hence, the pressure should be practically uniform, a result which can be obtained by providing a yielding connection between arm 75 and shaft 76. And since folding along the lines indicated herein practically provides end flaps of unequal thickness, this yielding connection is especially desirable. The other condition to be met is the possibilities resulting from the pressure applications in a regular succession where failure to present a charge at the proper time would bring the pressure-applying roller into direct contact with the adhesive coating of roll 68, a condition where the adhesive would be transferred to the face of roll 74 and tend to apply adhesive to the lower face of the succeeding end flap. These conditions are met by providing arms 75 with an elongated slot 75ª into which the complemental key 75ᵇ carried by shaft 76, extends, a tension spring 79 being employed as the yielding connection between the arm and shaft, said spring tending to maintain the arm with the key at one end of the slot, the slot permitting the arm to yield against the tension of spring 79 when pressure is being applied. In addition, shaft 76 carries an arm 80 to which one end of a spring 81 is secured, the opposite end of the spring being connected to the frame of the machine (Fig. 2), this spring also tending to move shaft 76 in the direction to apply the pressure. Excepting when pressure is to be applied, roller 74 is held out of pressure-applying position (full line position of Fig. 25) through the action of the high part of cam 77 on roller 78ª which rocks shaft 76 in a direction to carry roller 74 out of its pressure-applying position, arm 78 being keyed to shaft 76 in the usual manner. When, however, roller 78 passes on to the lower portion of cam 77, spring 81 will rock shaft 76 to bring roller 74 into contact with the under face of the charge flap (dotted line position of Fig. 9), thus bringing into action the pressure control provided by spring 79. Should, by any mishap, the flap reach a thickness greater than the length of slot 75ª, so that yielding to a sufficient extent would not be permitted by such slot, spring 81 would form an additional connection so as to relieve the excess pressure. As a result, the pressure application is automatically controllable so as to practically insure the proper uniform distribution of the adhesive on the flap.

To meet the second condition indicated, I employ means, operated manually, for preventing arm 78 from moving in pressure-applying direction, thus retaining roller 74 out of a position where it would contact with the adhesive roll 68 in case the charge is not present at the time of pressure-applying movement of arm 75. This means is in the form of a lever 82 mounted on shaft 76, said lever extending to a point convenient to the operator. This lever is shiftable between two positions, as shown more particularly in Figs. 9 and 10, Fig. 9 showing the lever in the position it occupies when the pressure-applying mechanism is free for normal movement, this position of the lever being also shown in dotted lines in Fig. 12; the full line position of Fig. 12 indicates the position of the lever when it has been shifted so as to prevent such pressure-applying movements, lever 82 carrying a latch device 83 coöperating with a member 84 for retaining the lever in either extreme of its movement. As shown in Figs. 9, 10 and 12, a lost motion action is provided between shaft 76 and lever 82, this lost motion device being shown as in the form of a slot 76ª in shaft 76 and a pin 82ª carried by the hub of lever 82 and which pin extends into slot 76ª. Obviously any other type of lost motion connection may be employed. This lost motion device permits of the oscillation of shaft 76 under normal action without affecting the position of lever 82. When, however, the lever is shifted from the position shown in Fig. 9 to that shown in full lines in Fig. 12, pin 82ª passes to a position where it prevents oscillation of shaft 76 and thus retains roller 74 in an inoperative position. By means of the latching mechanism, it will be readily understood that shifting of the lever to retain roller 74 in inoperative position can be had with rapidity, and the roller be maintained in such position until the lever is again returned to its normal position. This is of advantage to meet emergencies.

The advancing charge, with its adhesively-coated lower end flaps then enters the zone of activity of folding devices adapted to turn-up these lower end flaps into overlapping relation to and into adhesive connection with the previously turned-in laps and flaps, the members for producing this action being shown more particularly in Figs. 20, and 26 to 30 inclusive, these members being in the form of blocks 85 having a cut-away portion varied in the direction of length of the block approximately as shown in Figs. 26 to 30.

As shown in Fig. 20, blocks 64 and 85 are spaced apart and are successively operative on the charge as the latter advances, rolls 68 being made operative on the charge between the successive operations of block 64 and 85.

As will be understood, the upper end flap is held in its down-turned position by block 64 as long as the charge is within the effective zone of said block. Since, however, application of adhesive and the turning-up of the lower end flap by means of a stationary block structure, requires exposure of the adhesive-receiving face and a free movement of the end flap during the turning-up action, block 85, cannot, itself, retain the turned-in upper end flap. Hence, I have provided a member 86 which, if desired, may be supported by blocks 64 and 85, this member carrying a downwardly extending blade 86ª (Figs. 4 and 20), this blade being positioned to retain the turned-down upper flap in its folded position, as shown for instance in Figs. 26 to 28, the result being that the previously folded portions of the wrapper are properly held in position during the time when the lower flap is receiving its adhesive coating and while it is being turned upward by block 85, the blade having its lower edge leading out of the plane of travel of the charge prior to the time when the vertical wall of the cut-away portion of block 85 brings the flap being turned into contact with the folded flap and laps. The fact that the active portion of the blade terminates prior to complete turning-up of the flap, does not materially affect the operation for the reason that the activity of the blade continues until the rear of the charge practically passes out of contact therewith, at which time blocks 85 have practically completed the folding and adhesive-connecting at the advance end of the charge, causing the adhesive connection to retain the folds.

As will be seen by an inspection of Figs. 21 to 24 and 26 to 30, each of blocks 64 and 85 have faces which are active in flap turning operations, the flap-turning taking place as the charge is advanced by the carrier, the blocks having the horizontal and vertical faces joined by curved face portions at an intermediate point so that the outer edges of the flaps will be readily guided in the proper direction without damage even though the material is relatively thin.

Figures 28, 29, 30:
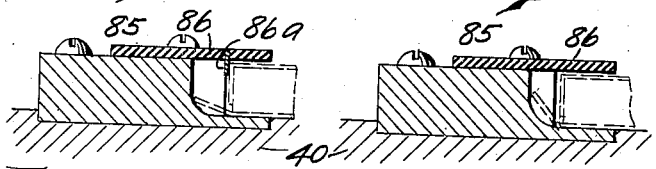

As shown in Fig. 30, closing of the ends of the charge is completed when the travel of the charge carries it from the zone of member 85, thus producing the package illustrated in Fig. 16. As shown in this view, the completed package has the lower end flap covering the overlapped ends of the wrapper, being adhesively connected in such manner that the lower end flap—now forming the outer flap—acts as an additional element for retaining the wrapper ends in proper position.

After leaving the zone of members 85, the package then continues its travel with the folded ends in opposition to guides 87 which extend for a considerable distance, sufficient, for instance, to afford a time element to permit the adhesive connection to become more or less set, guides 87 preventing the folded flaps from attempting to move away from their proper folded condition.

As will be understood, the completed package may then be discharged from the main portion of the machine in any suitable manner. In the drawings, however, I have shown the use of a receiving table or structure 88 into which the packages are successively delivered as shown more particularly in Figs. 1 and 3. As shown in Fig. 3, member 46ª will continue to advance the package until it is carried out of contact with the rear face of the package by its movement in rounding shaft 45, thus leaving the package resting on the table top. As the succeeding package is delivered, its advance face contacts with the rear face of the previously delivered package, so that the latter then advances and passes on to the table 88, being preferably held in an inclined position by face 88ª of the table, the advance of the succeeding package simply advancing the packages previously on the table and itself becoming the rearmost package on such table, the result being that the packages are practically collected on the table from which they may be removed in quantities in an obvious manner.

From the above description it will be seen that the charge is continuously in movement from the time it leaves the magazine until it passes out of contact with its advancing member 46ª, there being no dwell in the movement, the successive operations thereon taking place while the charge is moving, these operations being provided by stationary devices with the exception of the turning-in of the rear end laps and the application of the adhesive, all of these operations taking place while the charge is traveling in substantially a single horizontal plane. Furthermore, those operations which require moving parts are all driven from the same shaft—49—with the operative connections positive, the result being that accurate timing is made possible. Successive charges may follow each other on the carrier at proper intervals, determined somewhat by the character of the work to be performed, Fig. 2 showing one charge practically leaving member 85 at the time when the succeeding charge is undergoing its end lap turning-in, so that, in the particular instance shown, two charges are being acted upon concurrently. This enables the use of the endless conveyer type of carrier with the conveyer provided with a number of members 46ª which successively remove charges from the magazine and deliver the completed packages on to table 88, the only requirement practically being to keep the magazine supplied with a sufficient number of charges. Should, for any reason, a member 46ª fail to take a charge, or should the laps or flaps not be properly positioned or formed, lever 82 can be quickly manipulated to prevent the application of pressure of or the application of adhesive to rollers 74.

In the structure described, the folding of the end laps is provided by a stationary channel and fingers which act to "kick in" the rear laps. In Figs. 31 and 32 I have shown a simple arrangement by means of which both front and rear laps may be "kicked in," the stationary folder for the advance end laps being replaced by a pivoted finger structure 90 having a toe 90ª coöperating with toe 58ᵇ of finger 58, the "kicking" movements of finger 90 being provided by a spring 91. The packet is held against lateral movement at this time by means of a roller 92 (Fig. 32). As will be seen, the fingers in this form operate substantially concurrently, the operation being controlled by cam 60. Similar provision as to buckling may be made.

For illustrative purposes, in Fig. 2 I have shown the operating devices located above the path of travel of the charge more or less fragmentary as by omitting parts, the similar devices below the path of travel in this figure being representative of the plan view structures. It will be understood of course that the members are complemental on opposite sides.

Where the apparatus is intended for use in connection with the wrapping of packets such for instance as plug tobacco, wherein slight variations may be present in walls of the plug, I preferably provide the folding members and devices, with vertical walls more or less yielding so as to permit of accommodation for such inequalities.
This arrangement is illustratively shown in Fig. 33, wherein the folder block (64 or 85) of the other views is shown as formed in two parts $m$ and $n$, part $m$ being secured to the table and forming a support for part $n$, the latter being movably secured on part $m$, slot $n'$ being provided for the purpose. Springs $p$ permit yielding of parts $n$.

This view also shows one way in which top wall of the channel structure may be made yieldable, a bracket $r$ extending over and being spaced from a top plate $t$, a spring $s$ extending between these parts.

As will be seen, the stationary folding and retaining members are all removable, so that they may be replaced by or interchanged with other members which will operate in connection with packets of another size. As fingers 58 are arranged to permit adjustment as is the adhesive-applying mechanism, rolls 68 being adjustable as are arms 75, and in addition, the magazine also has its walls adjustable, the machine is not limited in operation to any particular size of packet. On the contrary, the parts are so arranged as to permit of considerable variation in sizes by the use of interchangeable, folding members and the other adjustments referred to, such changes, however, not affecting the general principles of the operation and the ability to produce a package properly wrapped and at the same time wrapped in such a form as to produce a neat and attractive appearance.
While I have disclosed the invention in specific detail, it is to be understood that variations or modifications therein structurally and otherwise may be required or desired to meet the exigencies of any particular use, and I desire to be understood as reserving the right to make any and all such changes or modifications as may be found essential in these respects in so far as the same may fall within the spirit and scope of the invention as expressed in the accompanying claims.

Having thus described my invention what I claim as new, is:

1. In mechanism for closing the ends of a charge having the form of a partially wrapped package, wherein the wrapper is free from flap-forming slits and the ends to be closed project outwardly in the several planes of the applied portions of the wrapper, a traveling conveyer adapted to advance the charge continuously from a charging station in approximately a single plane, and instrumentalities located adjacent the path of the charge in the direction of advance from said station operative in the path of and during travel of the charge in such plane to provide a predetermined sequence of end manipulations as follows: infold the end laps to produce opposing flaps, fold one of said flaps to produce the inner end flap, apply adhesive to the inner face of the other flap, and fold the latter flap to apply its adhesive coated face to the previously folded flap and laps.

2. In mechanism for closing the ends of a charge having the form of a partially wrapped package, wherein the wrapper is free from flap-forming slits and the ends to be closed project outwardly in the several planes of the applied portions of the wrapper, a traveling conveyer adapted to advance the charge continuously from a charging station in approximately a single plane, and instrumentalities located adjacent the path of the charge in the direction of advance from said station operative in the path of and during travel of the charge in such plane to provide a predetermined sequence of end manipulations, said instrumentalities including means for turning-in end laps to produce opposing flaps at the ends of the package, means for successively folding the resultant end flaps, and means operative on the last folded flap prior to its folding for applying adhesive coating to its inner face.

3. In mechanism for closing the ends of a charge having the form of a partially wrapped package, wherein the wrapper is free from flap-forming slits and the ends to be closed project outwardly in the several planes of the applied portions of the wrapper, a traveling conveyer adapted to advance the charge continuously from a charging station in approximately a single plane, and instrumentalities located adjacent the path of the charge in the direction of advance from said station operative in the path of and during travel of the charge in such plane to provide a predetermined sequence of end manipulations, said instrumentalities including means for producing opposing flaps at the ends of the package, means for successively folding the resultant end flaps into overlapping relation, and means operative on the last folded flap prior to its being folded for applying an adhesive coating to its inner face.

4. In mechanism for closing the ends of a charge having the form of a partially wrapped package, wherein the wrapper is free from flap-forming slits and the ends to be closed project outwardly in the several planes of the applied portions of the wrapper, a traveling conveyer adapted to advance the charge continuously in approximately a single plane, a hopper for the charge so located relative to the conveyer as to cause the latter to advance the charge directly from the hopper, and means for producing opposing end flaps at the ends of the package during advance of the charge.

5. In mechanism for closing the ends of a charge having the form of a partially wrapped package, wherein the wrapper is free from flap-forming slits and the ends to be closed project outwardly in the several planes of the applied portions of the wrapper, a traveling conveyer adapted to advance the charge continuously from a charging station in approximately a single plane, and means located adjacent the path of the charge in the direction of advance from said station for producing opposing end flaps at the ends of the package during advance of the charge, said means including an oscillating element having a folding face normally out of the path of travel of an unfolded end of the charge, said means being movable to advance said face across the rear wall of such end to infold such wall against the ends of the contained package.

6. In mechanism for closing the ends of a charge having the form of a partially wrapped package, wherein the wrapper is free from flap-forming slits and the ends to be closed project outwardly in the several planes of the applied portions of the wrapper, a traveling conveyer adapted to advance the charge continuously from a charging station in approximately a single plane, and means located adjacent the path of the charge in the direction of advance from said station for producing opposing end flaps at the ends of the package during advance of the charge, said means including an oscillating element having a folding face normally out of the path of travel of an unfolded end of the charge, said means being movable to advance said face across the rear wall of such end to infold such wall against the end of the contained package, said element having a limited length of travel, and having its advancing movement at a travel speed greater than the travel speed of the charge.

7. In mechanism for closing the ends of a charge having the form of a partially wrapped package, wherein the wrapper is free from flap-forming slits and the ends to be closed project outwardly in the several planes of the applied portions of the wrapper, a traveling conveyer adapted to advance the charge continuously from a charging station in approximately a single plane, and means located adjacent the path of the charge in the direction of advance from said station for producing opposing end flaps at the ends of the package during advance of the charge, said means including an oscillating element having a limited range of movement, said element having a folding face normally out of the path of travel of an unfolded end of the charge, and means for advancing said element into such path of travel, said latter means being rendered active when the rear wall of such unfolded end has advanced beyond the point where said face enters the path of travel of such wall, said means being also adapted to move said face at a speed greater than the travel speed of the charge, whereby said face will be moved across said wall to infold it upon an end of the contained package.

8. In mechanism for closing the ends of a charge having the form of a partially wrapped package, the combination with a traveling conveyer adapted to advance the charge continuously from a charging station in approximately a single plane, of means located adjacent the path of the charge in the direction of advance from said station for producing opposing flaps at the ends of the charge by infolding of the front and rear walls of the unfolded wrapper ends during the advance of the charge, said means including an oscillatory element movable in the plane of an unfolded end of the advancing charge and having a folding face normally positioned out of the path of travel of said walls, means for advancing said element to move said face across said rear wall, and means for limiting the advance movement of said element.

9. In mechanism for closing the ends of a charge having the form of a partially wrapped package, the combination with a traveling conveyer adapted to advance the charge continuously in approximately a single plane, of means for producing opposing flaps at the ends of the charge by infolding of the front and rear walls of the unfolded wrapper ends during the advance of the charge, said means including an oscillatory element movable in the plane of an unfolded end of the advancing charge and having a folding face normally positioned out of the path of travel of said walls, means for advancing said element to move said face across said rear wall, and means for limiting the advance movement of said element, said limiting means being adjustable to vary the length of such advance movement.

10. In mechanism for closing the ends of a charge having the form of a partially wrapped package, the combination with a traveling conveyer adapted to advance the charge continuously from a charging station in approximately a single plane, of means located adjacent the path of the charge in the direction of advance from said station for producing opposing flaps at the ends of the charge by infolding of the front and rear walls of the unfolded wrapper ends during the advance of the charge, said means including an oscillatory element movable in the plane of an unfolded end of the advancing charge and having a folding face normally positioned out of the path of travel of said walls, means for advancing said element to move said face across said rear wall, and means for limiting the advance movement of said element, said element including a member carrying said face and adapted to determine the radius of the arc traveled by said face, said member being adjustable to vary the length of such radius.

11. In mechanism for closing the ends of a charge having the form of a partially wrapped package, the combination with a traveling conveyer adapted to advance the charge continuously in approximately a single plane, of means for producing opposing flaps at the ends of the charge by infolding of the front and rear walls of the unfolded wrapper ends during the advance of the charge, said means including an oscillatory element movable in the plane of an unfolded end of the advancing charge and having a folding face normally positioned out of the path of travel of said walls, a shaft for supporting said element, a spring tending to move said element in a direction to advance the element, and cam mechanism for controlling the time of spring activity.

12. In mechanism for closing the ends of a charge having the form of a partially wrapped package, the combination with a traveling conveyer adapted to advance the charge continuously in approximately a single plane, of means for producing opposing flaps at the ends of the charge by infolding of the front and rear walls of the unfolded wrapper ends during the advance of the charge, said means including an oscillatory element movable in the plane of an unfolded end of the advancing charge and having a folding face normally positioned out of the path of travel of said walls, a shaft for supporting said element, a spring tending to move said shaft in a direction to advance the element, and cam mechanism operative to determine the time of spring activity and to return the element to its normal position.

13. In mechanism for closing the ends of a charge having the form of a partially wrapped package, the combination with a traveling conveyer adapted to advance the charge continuously in approximately a single plane, of means for producing opposing flaps at the ends of the charge by infolding of the front and rear walls of the unfolded wrapper ends during the advance of the charge, said means including an oscillatory element movable in the plane of an unfolded end of the advancing charge and having a folding face normally positioned out of the path of travel of said walls, a shaft for supporting said element, a spring tending to move said shaft in a direction to advance the element, cam mechanism for controlling the time of spring activity, and means for operatively connecting said cam mechanism and said conveyer to cause spring activity at a predetermined point in the advance movement of the charge by the conveyer.

14. In mechanism for closing the ends of a charge having the form of a partially wrapped package, the combination with a traveling conveyer adapted to advance the charge continuously in approximately a single plane, of means for producing opposing flaps at the ends of the charge by infolding of the front and rear walls of the unfolded wrapper ends during the advance of the charge, said means including an oscillatory element movable in the plane of an unfolded end of the advancing charge and having a folding face normally positioned out of the path of travel of said walls, a shaft for supporting said element, a spring tending to move said shaft in a direction to advance the element, and cam mechanism operative to determine the time of spring activity and to return the element to its normal position, said cam mechanism including a projecting member carried by the shaft, and a cam having a face against which said member normally contacts and also being cut-away to free said member from obstruction, whereby said element is free to move under maximum spring power, and means for limiting the advance movement of the element.

15. In mechanism for closing the ends of a charge having the form of a partially wrapped package, wherein the wrapper is free from flap-forming slits and the ends to be closed project outwardly in the several planes of the applied portions of the wrapper, a traveling conveyer adapted to advance the charge continuously in approximately a single plane, and means for producing opposing end flaps at the ends of the package during advance of the charge, said means including mechanisms for infolding the advance and rear walls of the charge, and means for compensating for buckling of the unfolded projecting ends during such infolding action.

16. In mechanism for closing the ends of a charge having the form of a partially wrapped package, wherein the wrapper is free from flap-forming slits and the ends to be closed project outwardly in the several planes of the applied portions of the wrapper, a traveling conveyer adapted to advance the charge continuously in approximately a single plane, and means for producing opposing end flaps at the ends of the package during advance of the charge, said means including mechanisms for infolding the advance and rear walls of the charge, said mechanisms including opposing walls between which the flap-forming portions of the ends are adapted to pass, and recesses in said walls to permit temporary buckling of such portions during such infolding action.

17. In mechanism for closing the ends of a charge having the form of a partially wrapped package, wherein the wrapper is free from flap-forming slits and the ends to be closed project outwardly in the several planes of the applied portions of the wrapper, a traveling conveyer adapted to advance the charge continuously in approximately a single plane, and means for producing opposing end flaps at the ends of the package during advance of the charge, said means including mechanisms for infolding the advance and rear walls of the charge, said mechanisms including opposing walls between which the flap-forming portions of the ends are adapted to pass, and a yieldable element carried by one of said walls and having a face contacting with and maintaining the previously folded portion of the upper face of the charge during such infolding operation.

18. In mechanism for closing the ends of a charge having the form of a partially wrapped package, wherein the wrapper is free from flap-forming slits and the ends to be closed project outwardly in the several planes of the applied portions of the wrapper, a traveling conveyer adapted to advance the charge continuously in approximately a single plane, and instrumentalities operative in the path of and during travel of the charge in such plane to provide a predetermined sequence of end manipulations, said instrumentalities including means for producing opposing end flaps at the ends of the package during advance of the charge, and means for successively folding the resultant end flaps, said latter means including an element having a channel for folding one of said flaps by travel of the charge, said element also having a channel for retaining the other flap against substantial movement from its initial plane.

19. In mechanism for closing the ends of a charge having the form of a partially wrapped package, wherein the wrapper is free from flap-forming slits and the ends to be closed project outwardly in the several planes of the applied portions of the wrapper, a traveling conveyer adapted to advance the charge continuously from a charging station in approximately a single plane, and instrumentalities located adjacent the path of the charge in the direction of advance from said station operative in the travel path and during travel of the charge to produce opposing end flaps and secure them in folded position at the ends of the package, said instrumentalities including mechanism for applying adhesive to a face of the last folded flap prior to its being folded.

20. In mechanism for closing the ends of a charge having the form of a partially wrapped package, wherein the wrapper is free from flap-forming slits and the ends to be closed project outwardly in the several planes of the applied portions of the wrapper, package conveying mechanism including a traveling conveyer adapted to advance the charge continuously in approximately a single plane, and instrumentalities operative in the travel path of the charge to produce opposing end flaps and secure them in folded position at the ends of the package, said instrumentalities including mechanism for applying adhesive to a face of the last folded flap prior to its being folded, said mechanism including an adhesive-applying roll positioned on one side of the travel path of a flap, a roll positioned on the opposite side of such travel path and shiftable toward and from the adhesive-applying roll, and means operably connected to the package conveying mechanism for timing the movements of the shiftable roll and conveyer to cause roll shifting toward the adhesive-applying roll when the conveyer advance interposes a flap between the rolls.

21. In mechanism for closing the ends of a charge having the form of a partially wrapped package, wherein the wrapper is free from flap-forming slits and the ends to be closed project outwardly in the several planes of the applied portions of the wrapper, a traveling conveyer adapted to advance the charge continuously in approximately a single plane, and instrumentalities operative in the travel path of the charge to produce opposing end flaps and secure them in folded position at the ends of the package, said instrumentalities including mechanism for applying adhesive to a face of the last folded flap prior to its being folded, said mechanism including an adhesive-applying roll positioned on one side of the travel path of a flap, a roll positioned on the opposite side of such travel path and shiftable toward and from the adhesive-applying roll, means for timing the movements of the shiftable roll and conveyer to cause roll shifting toward the adhesive-applying roll when the conveyer advance interposes a flap between the rolls, and means for manually preventing the shifting movement of the roll at will.

22. In mechanism for closing the ends of a charge having the form of a partially wrapped package, the combination with a traveling conveyer adapted to advance the charge continuously in approximately a single plane, of mechanism for producing opposing flaps at the ends of the charge by infolding of the front and rear walls of the unfolded wrapper ends during advance of the charge, and mechanism for applying adhesive to a face of one of the opposing flaps, said latter mechanism including rolls positioned on opposite sides of the travel path of an advancing flap, one of said rolls having an adhesive-applying face, said roll having a fixed position, and means automatically operated in timed relation with the conveyer for shifting the other roll into and out of a position adapted to bring the adhesive-applying roll and advancing flap into adhesive-applying relation.

23. In mechanism for closing the ends of a charge having the form of a partially wrapped package, the combination with a traveling conveyer adapted to advance the charge continuously in approximately a single plane, of mechanism for producing opposing flaps at the ends of the charge by infolding of the front and rear walls of the unfolded wrapper ends during advance of the charge, and mechanism for applying adhesive to a face of one of the opposing flaps, said latter mechanism including rolls positioned on opposite sides of the travel path of an advancing flap, one of said rolls having an adhesive-applying face, said roll having a fixed position, and means for shifting the other roll into and out of a position adapted to bring the adhesive-applying roll and advancing flap into adhesive-applying relation, said means including an arm on which the roll is mounted, a shaft on which the arm is mounted with a yielding connection, and means for rocking the shaft at predetermined intervals.

24. In mechanism for closing the ends of a charge having the form of a partially wrapped package, the combination with a traveling conveyer adapted to advance the charge continuously in approximately a single plane, of mechanism for producing opposing flaps at the ends of the charge by infolding of the front and rear walls of the unfolded wrapper ends during advance of the charge, and mechanism for applying adhesive to a face of one of the opposing flaps, said latter mechanism including rolls positioned on opposite sides of the travel path of an advancing flap, one of said rolls having an adhesive-applying face, said roll having a fixed position, and means for shifting the other roll into and out of a position adapted to bring the adhesive-applying roll and advancing flap into adhesive-applying relation, said means including an arm on which the roll is mounted, a shaft on which the arm is mounted with a lost motion connection, a spring operatively connecting the arm and shaft, and means for rocking the shaft at predetermined intervals, said connection and spring coöperating to provide a substantially uniform pressure on the flap during its travel in contact with both rolls.

25. In mechanism for closing the ends of a charge having the form of a partially wrapped package, the combination with a traveling conveyer adapted to advance the charge continuously in approximately a single plane, of mechanism for producing opposing flaps at the ends of the charge by infolding of the front and rear walls of the unfolded wrapper ends during advance of the charge, and mechanism for applying adhesive to a face of one of the opposing flaps, said latter mechanism including rolls positioned on opposite sides of the travel path of an advancing flap, one of said rolls having a fixed position, and means for shifting the other roll into and out of a position adapted to bring the adhesive-applying roll and advancing flap into adhesive-applying relation, said means including an arm on which the roll is mounted, a shaft on which the arm is mounted with a yielding connection, a second shaft carrying a cam, and operative connections between the cam and the first-mentioned shaft for rocking the latter at predetermined intervals.

26. In mechanism for closing the ends of a charge having the form of a partially wrapped package, the combination with a traveling conveyer adapted to advance the charge continuously in approximately a single plane, of mechanism for producing opposing flaps at the ends of the charge by infolding of the front and rear walls of the unfolded wrapper ends during advance of the charge, and mechanism for applying adhesive to a face of one of the opposing flaps, said latter mechanism including rolls positioned on opposite sides of the travel path of an advancing flap, one of said rolls having an adhesive-applying face, said roll having a fixed position, and means for shifting the other roll into and out of a position adapted to bring the adhesive-applying roll and advancing flap into adhesive-applying relation, said means including an arm on which the roll is mounted, a shaft on which the arm is mounted with a yielding connection, an arm fixed on said shaft, tension means connected with said latter arm and adapted to rock said shaft in a direction to render said rolls operative, a second shaft carrying a cam, and operative connections between said cam and the first-named shaft to control such rocking movements.

27. In mechanism for closing the ends of a charge having the form of a partially wrapped package, the combination with a traveling conveyer adapted to advance the charge continuously in approximately a single plane, of mechanism for producing opposing flaps at the ends of the charge by infolding of the front and rear walls of the unfolded wrapper ends during advance of the charge, and mechanism for applying adhesive to a face of one of the opposing flaps, said latter mechanism including rolls positioned on opposite sides of the travel path of an advancing flap, one of said rolls having an adhesive-applying face, said roll having a fixed position, and means for shifting the other roll into and out of a position adapted to bring the adhesive-applying roll and advancing flap into adhesive-applying relation, said means including an arm on which the roll is mounted, with a lost motion connection, a spring operatively connecting the arm and shaft, means for rocking the shaft at predetermined intervals, said connection and spring coöperating to provide substantially uniform pressure on the flap during its travel in contact with both rolls, and a manually shiftable lever structure mounted on said shaft with a lost motion connection, said structure, in one position, permitting normal rocking movements of the shaft, shifting of said structure rendering said shaft-rocking means ineffective to bring the rollers into adhesive-applying relation.

28. In mechanism for closing the ends of a charge having the form of a partially wrapped package, wherein the wrapper is free from flap-forming slits and the ends to be closed project outwardly in the several planes of the applied portions of the wrapper, a traveling conveyer adapted to advance the charge continuously in approximately a single plane, and instrumentalities operative in the path of travel of the charge for providing end manipulations to close the ends of the package, said instrumentalities including mechanism for producing opposing flaps at the ends of the package during advance of the charge, mechanism for folding one of the opposing flaps into end closing position while maintaining the opposite flap unfolded, mechanism for applying adhesive to the unfolded flap, and means for folding the adhesively-coated flap to complete the end closing.

29. In mechanism for closing the ends of a charge having the form of a partially wrapped package, wherein the wrapper is free from flap-forming slits and the ends to be closed project outwardly in the several planes of the applied portions of the wrapper, a traveling conveyer adapted to advance the charge continuously from a charging station in approximately a single plane, and instrumentalities located adjacent the path of the charge in the direction of advance from said station operative in the path of travel of the charge for providing end manipulations to close the ends of the package, said instrumentalities including mechanism for producing opposing flaps at the ends of the package during advance of the charge, mechanism for folding one of the opposing flaps into end closing position while maintaining the opposite flap unfolded, mechanism for applying adhesive to the unfolded flap, and means for folding the adhesively-coated flap to complete the end closing, said means including an element having a stationary channel for folding the adhesively-coated flap into end closing relation.

30. In mechanism for closing the ends of a charge having the form of a partially wrapped package, wherein the wrapper is free from flap-forming slits and the ends to be closed project outwardly in the several planes of the applied portions of the wrapper, a traveling conveyer adapted to advance the charge continuously in approximately a single plane, and instrumentalities operative in the path of travel of the charge for providing end manipulations to close the ends of the package, said instrumentalities including mechanism for producing opposing flaps at the ends of the package during advance of the charge, mechanism for folding one of the opposing flaps into end closing position while maintaining the opposite flap unfolded, mechanism for applying adhesive to the unfolded flap, and means for folding the adhesively-coated flap to complete the end closing, said means including an element having a stationary channel for folding the adhesively-coated flap into end closing relation, and means located between and mounted on the mechanism for folding the first flap and the means for folding the adhesive-coated flap, operative to maintain the previously infolded flap in its folded position during the adhesive application to and folding movements of the other flap, said means including a blade member detachably connected to either said folding means or said folding mechanism.

31. In mechanism for closing the ends of a charge having the form of a partially wrapped package, wherein the wrapper is free from flap-forming slits and the ends to be closed project outwardly in the several planes of the applied portions of the wrapper, a traveling conveyer adapted to advance the charge continuously in approximately a single plane, and instrumentalities operative in the path of and during travel of the charge in such plane to provide a predetermined sequence of end manipulations, said instrumentalities including means for producing opposing flaps at the ends of the package, means for successively folding the resultant end flaps into overlapping relation, and means operative on the last folded flap prior to its being folded for applying an adhesive coating to its inner face, said end flap folding means including channel-forming elements of which the folding means constitute a channel wall, the top element of the channel being vertically yieldable.

32. In mechanism for closing the ends of a charge having the form of a partially wrapped package, wherein the wrapper is free from flap-forming slits and the ends to be closed project outwardly in the several planes of the applied portions of the wrapper, a traveling conveyer adapted to advance the charge continuously in approximately a single plane, and instrumentalities operative in the path of and during travel of the charge in such plane to provide a predetermined sequence of end manipulations, said instrumentalties including means for producing opposing flaps at the ends of the package, means for successively folding the resultant end flaps into overlapping relation, and means operative on the last folded flap prior to its being folded for applying an adhesive coating to its inner face, said end flap folding means including folders yieldable transverse to the direction of travel of the package, said folders forming a wall of channel-forming elements, the top element of the channel being vertically yieldable.

In testimony whereof I have hereunto set my hand.

JAMES B. HARRISS.